United States Patent
Vu et al.

(10) Patent No.: US 12,404,179 B2
(45) Date of Patent: Sep. 2, 2025

(54) METHOD FOR THE MANUFACTURE OF REDUCED GRAPHENE OXIDE FROM EXPANDED KISH GRAPHITE

(71) Applicant: ArcelorMittal, Luxembourg (LU)

(72) Inventors: Thi Tan Vu, Oviedo (ES); David Noriega Perez, Oviedo Asturias (ES); Roberto Suarez Sanchez, Aviles Asturias (ES)

(73) Assignee: ArcelorMittal, Luxembourg (LU)

( * ) Notice: Subject to any disclaimer, the term of this patent is extended or adjusted under 35 U.S.C. 154(b) by 162 days.

(21) Appl. No.: 17/611,277

(22) PCT Filed: May 12, 2020

(86) PCT No.: PCT/IB2020/054459
§ 371 (c)(1),
(2) Date: Nov. 15, 2021

(87) PCT Pub. No.: WO2020/230010
PCT Pub. Date: Nov. 19, 2020

(65) Prior Publication Data
US 2022/0234898 A1    Jul. 28, 2022

(30) Foreign Application Priority Data
May 16, 2019    (WO) .................. PCT/IB2019/054058

(51) Int. Cl.
*C01B 32/23*    (2017.01)

(52) U.S. Cl.
CPC .......... *C01B 32/23* (2017.08); *C01B 2204/04* (2013.01); *C01B 2204/30* (2013.01)

(58) Field of Classification Search
CPC ....... C01B 32/21; C01B 32/22; C01B 32/225; C01B 32/23; C01B 2204/04; C01B 2204/30
See application file for complete search history.

(56) References Cited

U.S. PATENT DOCUMENTS

| | | |
|---|---|---|
| 2,798,878 A | 7/1957 | Hummers, Jr. et al. |
| 3,404,061 A | 10/1968 | Shane et al. |

(Continued)

FOREIGN PATENT DOCUMENTS

| | | |
|---|---|---|
| CN | 102020270 A | 4/2011 |
| CN | 103408000 A | 11/2013 |

(Continued)

OTHER PUBLICATIONS

Wu, Zhong-Shuai, et al. "Synthesis of high-quality graphene with a pre-determined No. of layers." Carbon 47.2 (2009): 493-499.*

(Continued)

*Primary Examiner* — Richard M Rump
(74) *Attorney, Agent, or Firm* — Davidson Kappel LLC

(57) ABSTRACT

A method for the manufacture of reduced graphene oxide from kish graphite including: A. The provision of kish graphite, B. Optionally, a pre-treatment of kish graphite, C. The intercalation of kish graphite with a persulfate salt and an acid at room temperature to obtain intercalated kish graphite, D. The expansion of the intercalated kish graphite to obtain expanded kish graphite and E. An oxidation step of the expanded kish graphite to obtain graphene oxide and F. A reduction of graphene oxide into reduced graphene oxide.

30 Claims, 1 Drawing Sheet

(56) References Cited

U.S. PATENT DOCUMENTS

| | | | |
|---|---|---|---|
| 4,075,114 | A | 2/1978 | Ishikawa et al. |
| 9,284,193 | B2 | 3/2016 | Cruz-Silva et al. |
| 11,702,341 | B2 | 7/2023 | Vu et al. |
| 2013/0261352 | A1 | 10/2013 | Zhou et al. |
| 2015/0071844 | A1* | 3/2015 | Kim .................. C01B 32/23 427/113 |
| 2016/0298244 | A1 | 10/2016 | Abdelkader et al. |
| 2016/0311688 | A1 | 10/2016 | Zhang et al. |
| 2017/0217775 | A1 | 8/2017 | Sohn et al. |
| 2018/0327268 | A1 | 11/2018 | Lu et al. |
| 2018/0339906 | A1* | 11/2018 | Lu ...................... C01B 32/19 |
| 2021/0179434 | A1 | 6/2021 | Vu et al. |
| 2021/0206646 | A1 | 7/2021 | Vu et al. |
| 2021/0221687 | A1 | 7/2021 | Vu et al. |
| 2021/0221688 | A1 | 7/2021 | Vu et al. |
| 2021/0230000 | A1 | 7/2021 | Vu et al. |
| 2021/0230003 | A1 | 7/2021 | Vu et al. |

FOREIGN PATENT DOCUMENTS

| | | |
|---|---|---|
| CN | 104909348 A | 9/2015 |
| CN | 107001047 A | 8/2017 |
| CN | 109534335 A | 3/2019 |
| JP | 2013544223 A | 12/2013 |
| JP | 2017501965 A | 1/2017 |
| JP | 2017502168 A | 1/2017 |
| JP | 2018534224 A | 11/2018 |
| KR | 101109961 B1 | 2/2012 |
| KR | 20160018257 | 2/2016 |
| KR | 20170061121 A | 6/2017 |
| KR | 20180059492 | 6/2018 |
| WO | WO2009013931 A1 | 1/2009 |
| WO | WO 2017/027731 A1 | 2/2017 |
| WO | WO2018105570 A1 | 6/2018 |
| WO | WO2018/178842 A1 | 10/2018 |
| WO | WO2018178845 A1 | 10/2018 |
| WO | WO2018218339 A1 | 12/2018 |
| WO | WO 2019/220227 A1 | 11/2019 |
| WO | WO 2019220228 A1 | 11/2019 |
| WO | WO 2021/001700 A1 | 1/2021 |

OTHER PUBLICATIONS

Liu, Ting, et al. "One-step room-temperature preparation of expanded graphite." Carbon 119 (2017): 544-547.*

Iskandar, Ferry, et al. "Microwave-assisted reduction method under nitrogen atmosphere for synthesis and electrical conductivity improvement of reduced graphene oxide (rGO)." RSC advances 7.83 (2017): 52391-52397.*

Youn, Duck Hyun, et al. "Fabrication of graphene-based electrode in less than a minute through hybrid microwave annealing." Scientific reports 4.1 (2014): 5492.*

Aliyev, Elvin, et al. "Structural characterization of graphene oxide: Surface functional groups and fractionated oxidative debris." Nanomaterials 9.8 (2019): 1180.*

Ganguly, Abhijit, et al. "Probing the thermal deoxygenation of graphene oxide using high-resolution in situ X-ray-based spectroscopies." The Journal of Physical Chemistry C 115.34 (2011): 17009-17019.*

Lin, Shan, et al. "Room-temperature intercalation and~ 1000-fold chemical expansion for scalable preparation of high-quality graphene." Chemistry of Materials 28.7 (2016): 2138-2146.*

Liu, Yuhang, et al. "Largely enhanced oxidation of graphite flakes via ammonium persulfate-assisted gas expansion for the preparation of graphene oxide sheets." Carbon 146 (2019): 618-626.*

Aunkor, M. T. H., et al. "The green reduction of graphene oxide." Rsc Advances 6.33 (2016): 27807-27828.*

See Search Report of PCT/IB2020/054459 dated Jul. 21, 2020.

Jung-Chul An et al.:"Preparation of Kish graphite-based graphene nanoplatelets by GIC (graphite intercalation compound) via process," Journal of Industrial and Engineering Chemistry 26 (2015) 55-60, Jun. 1, 2015.

Jiang et al."Preparation of high-quality graphene using triggered microwave reduction under an air atmosphere", Journal of Materials Chemistry C, (2018), vol. 6, ISSN 0004961568, pp. 1829-1835.

Sun et al. "Mass production of graphene oxide from expanded graphite," Mater Letters, 109, (2013) pp. 207-2010, year 2013.

See Search Report of PCT/IB2020/054458 dated Aug. 8, 2020.

* cited by examiner

METHOD FOR THE MANUFACTURE OF REDUCED GRAPHENE OXIDE FROM EXPANDED KISH GRAPHITE

The present invention relates to a method for the manufacture of reduced graphene oxide from expanded Kish graphite. In particular, reduced graphene oxide will have applications in metal industries including steel, aluminum, stainless steel, copper, iron, copper alloys, titanium, cobalt, metal composite, nickel industries, for example as coating or as a cooling reagent.

BACKGROUND

Kish graphite is a byproduct generated in the steelmaking process, especially during the blast furnace process or iron making process. Indeed, Kish graphite is usually produced on the free surface of molten iron during its cooling. It comes from molten iron at 1300-1500° C., which is cooled at a cooling rate between 0.40° C./min and 25° C./h when transported in the torpedo car or at higher cooling rates during the ladle transfer. An extensive tonnage of Kish graphite is produced annually in a steel plant.

Since Kish graphite comprises a high amount of carbon, usually above 50% by weight, it is a good candidate to produce graphene-based materials. Usually, graphene based materials include: graphene, graphene oxide, reduced graphene oxide or nanographite.

It is known to produce reduced graphene oxide (rGO) by reducing graphene oxide (GO). Reduced graphene oxide is composed of one or a few layers of graphene sheets containing some oxygen functional groups. Thanks to its interesting properties such as a high thermal conductivity and a high electrical conductivity, reduced graphene oxide, being hydrophobic, has many applications.

For example, reduced Graphene Oxide can be produced by chemical process such as a reduction of graphene oxide using a reducing agent such as hydrazine, ascorbic acid, urea, NaOH or by mechanical process such as thermal reduction at high temperature in an inert atmosphere. However, rGO with low oxygen content, i.e lower than 10%, is very difficult to obtain. Indeed, chemical or mechanical processes usually provides rGO having more than 10% of oxygen groups. Some oxygens groups such as epoxy groups are very difficult to reduce with conventional methods. In addition, the obtained rGO contains lot of defects thus demonstrating very low electrical conductivity.

Usually, reduced graphene oxide is synthesized based on Hummer Method comprising the following steps:
the oxidation of Kish graphite with sodium nitrate ($NaNO_3$), sulfuric acid ($H_2SO_4$) and sodium or potassium permanganate ($KMnO_4$) and
the reduction of graphene oxide to obtain the reduced graphene oxide.

SUMMARY OF THE INVENTION

The patent application publication WO2018178845 discloses a method for the manufacture of reduced graphene oxide from kish graphite comprising:
A. The provision of kish graphite,
B. A pre-treatment step of said kish graphite comprising the following successive sub-steps:
  i. A sieving step wherein the kish graphite is classified by size as follows:
    a) Kish graphite having a size below 50 μm,
    b) Kish graphite having a size above or equal to 50 μm, the fraction a) of kish graphite having a size below 50 μm being removed,
  ii. A flotation step with the fraction b) of kish graphite having a size above or equal to 50 μm,
  iii. An acid leaching step wherein an acid is added so that the ratio in weight (acid amount)/(kish graphite amount) is between 0.25 and 1.0,
  iv. Optionally, the kish graphite is washed and dried,
C. An oxidation step of the pre-treated kish graphite obtained after step B) in order to obtain graphene oxide with an acid, sodium nitrate and an oxidizing agent and
D. A reduction of graphene oxide into reduced graphene oxide.

Nevertheless, when the oxidation step is performed with sodium nitrate ($NaNO_3$), toxic gases are produced leading to a polluting method. Moreover, the oxidation time is very long using (around 3 hours).

The patent application PCT/162019/052804 now published as WO 2019/220227 A1 discloses a method for the manufacture of reduced graphene oxide from kish graphite comprising:
A. The provision of kish graphite,
B. A pre-treatment step of said kish graphite comprising the following successive sub-steps:
  i. A sieving step wherein the kish graphite is classified by size as follows:
    a) Kish graphite having a size below 50 μm,
    b) Kish graphite having a size above or equal to 50 μm, the fraction a) of kish graphite having a size below 50 μm being removed,
  ii. A flotation step with the fraction b) of kish graphite having a size above or equal to 50 μm,
  iii. An acid leaching step wherein an acid is added so that the ratio in weight (acid amount)/(kish graphite amount) is between 0.25 and 1.0,
  iv. Optionally, the kish graphite is washed and dried,
C. An oxidation step of the pre-treated kish graphite in order to obtain graphene oxide with an acid, ammonium nitrate ($NH_4NO_3$) and an oxidizing agent and
D. A reduction of graphene oxide into reduced graphene oxide.

However, although the method using $NH_4NO_3$ is less polluting than the method using $NaNO_3$, there is a need to further provide an even less polluting method and to reduce the energy consumption.

Additionally, although the oxidation time is shorter using $NH_4NO_3$, i.e. 1 hour and 30 minutes, compared to the oxidation time of the method using $NaNO_3$, i.e. 3 hours, there is still a need to reduce the oxidation time and therefore to improve the productivity of the synthesis of reduced graphene oxide.

It is an object of the present invention to provide an industrial method to obtain reduced graphene oxide having good quality in the shortest time possible. Additionally the purpose of the invention is to provide a less polluting method for the manufacture of reduced graphene oxide from Kish graphite compared to the prior art methods.

The present invention provides a method for the manufacture of reduced graphene oxide from kish graphite comprising:
A. The provision of kish graphite,
B. Optionally, a pre-treatment of kish graphite,
C. The intercalation of kish graphite with a persulfate salt and an acid at room temperature to obtain intercalated kish graphite,
D. The expansion of the intercalated kish graphite at room temperature to obtain expanded kish graphite,
E. An oxidation step of the expanded kish graphite to obtain graphene oxide and F. A reduction of graphene oxide into reduced graphene oxide.

The method may also have the optional features listed below, considered individually or in combination:

In step B), the pre-treatment of kish graphite comprises the following successive sub-steps:

A sieving step wherein the kish graphite is classified by size as follows:

Kish graphite having a size below 50 μm,

Kish graphite having a size above or equal to 50 μm, the fraction a) of kish graphite having a size below 50 μm being removed, A flotation step with the fraction b) of kish graphite having a size above or equal to 50 μm, An acid leaching step wherein an acid is added so that the ratio in weight (acid amount)/(kish graphite amount) is between 0.25 and 1.0, Optionally, the kish graphite is washed and dried, In step C), the ratio in weight of persulfate salt with respect to kish graphite is between 1 and 8, In step C), the ratio in weight of the acid with respect to kish graphite is between 2 and 8, In step C), the persulfate salt is chosen from: Sodium persulfate ($Na_2S_2O_8$), Ammonium persulfate (($NH_4$)$_2S_2O_8$) and Potassium persulfate ($K_2S_2O_8$) or a mixture thereof, In step C), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof, In step D), the expansion is naturally performed by leaving the kish graphite, the persulfate salt and the acid at room temperature in an open vessel, Step E) comprises the following successive sub-steps:

The mixture of the expanded kish graphite with an acid, an oxidizing agent and optionally a salt, The addition of a chemical element to stop the oxidation reaction, the separation of graphite oxide from the mixture obtained in step E.ii), The exfoliation of graphite oxide into graphene oxide, In step E.i), the salt is a nitrate salt chosen from: $NaNO_3$, $NH_4NO_3$, $KNO_3$, $Ni(NO_3)_2$, $Cu(NO_3)_2$, $Zn(NO_3)_2$, $Al(NO_3)_3$ or a mixture thereof, In step E.i), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof, In step E.i), the oxidizing agent is chosen from: potassium permanganate, $H_2O_2$, $O_3$, $H_2S_2O_8$, $H_2SO_5$, $KNO_3$, NaClO or a mixture thereof, In step E.ii), the chemical element used to stop the oxidation reaction is chosen from: an acid, non-deionized water, deionized water, $H_2O_2$ or a mixture thereof, When at least two chemical elements are chosen to stop the reaction, they are used successively or simultaneously, In step E.ii), the mixture obtained in step E.i) is gradually pumped into the chemical element used to stop the oxidation reaction, In step E.iii), the graphite oxide is separated by centrifugation, decantation, distillation or filtration, In step E.iv), the exfoliation is performed by using ultrasound, mechanical agitator, sieve shaker or thermal exfoliation, Step F) comprises the following sub-steps:

The reduction of GO into reduced graphene oxide (rGO), comprising one or a few layer(s) of graphene having between 10 and 25% by weight of oxygen functional groups, using a reducing agent and Optionally, the reduction of rGO into microwave-reduced graphene oxide (MW-rGO), comprising one or a few layer(s) of graphene having less than 10% by weight of oxygen functional groups, by microwaving rGO under air atmosphere in presence of a catalyst, In step F.i), the reducing agent is chosen from: acid ascorbic; urea; hydrazine hydrate; alkaline solution such as NaOH or KOH; phenols such as gallic acid, tannin acid, dopamine or tea polyphenol; alcohols such as methyl alcohol, ethyl alcohol or isopropyl alcohol; glycine; sodium citrate or sodium borohydride, In step F.ii), the catalyst is chosen from: pristine graphene, graphene nanoplatelet(s), graphite or graphite nanoplatelets.

The following terms are defined:

Graphene oxide means one or a few layer(s) of graphene comprising oxygen functional groups including ketone groups, carboxyl groups, epoxy groups and hydroxyl groups, Reduced graphene oxide means graphene oxide that has been reduced. The reduced graphene oxide comprises one or a few layer(s) of graphene having some oxygen functional groups including ketone groups, carboxyl groups, epoxy groups and hydroxyl groups, Pristine graphene means that graphene is in its original condition, i.e. ideal, and does not have any defect.

room temperature means between 0 and 45° C. at atmospheric pressure.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

Figure 1:
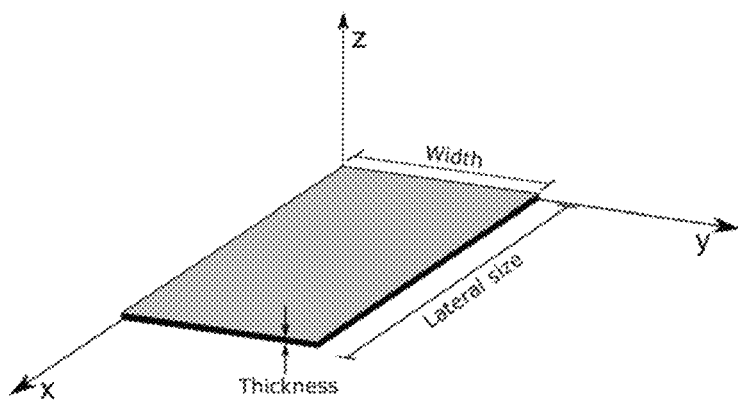
FIG. 1 illustrates an example of one layer of reduced graphene oxide according to the present invention.

The invention relates to a method for the manufacture of reduced graphene oxide from kish graphite comprising:

A. The provision of kish graphite,

B. Optionally, a pre-treatment of kish graphite,

C. The intercalation of kish graphite with a persulfate salt and an acid at room temperature to obtain intercalated kish graphite, D. The expansion of the intercalated kish graphite at room temperature to obtain expanded kish graphite, E. An oxidation step of the expanded kish graphite to obtain graphene oxide and F. A reduction of graphene oxide into reduced graphene oxide.

The method according to the present invention allows for the production of reduced graphene oxide having good quality. Moreover, the method including notably the intercalation at room temperature, the expansion at room temperature and the oxidation into graphene oxide, it is easy to implement at industrial scale and it is less polluting than methods of the prior art.

Without willing to be bound by any theory, it is believed that during the expansion, the persulfate salt acts like an oxidant to oxidize the edges of the kish graphite layers. Since the persulfate salt is an important oxygen donor, the intercalation gap between two kish graphite layers is further improved allowing the acid to enter more easily between the kish graphite layers. At the same time, a certain amount of persulfate salt can be dragged by the acid in the kish graphite interlayers. It is believed that the persulfate salt dragged in the interlayers will decompose and release $O_2$ gas causing an instantaneous pressure in the kish graphite interlayers making an exponential expansion of graphite at room temperature. The energy consumption is thus reduced and expanded kish graphite is easily obtained.

Moreover, it is believed that using expanded kish graphite according to the present invention significantly reduces the oxidation time compared to the methods for the manufacture of graphene oxide of the prior art. Indeed, it is believed that since there is a higher expansion volume, it is easier to oxidize the kish graphite layers since the gap between two kish graphite layers is higher using the persulfate salt and the acid. Thus, the oxidation time is significantly reduced and graphene oxide is easily obtained.

Preferably, in step A), the Kish graphite is a residue of the steelmaking process. For example, it can be found in a blast furnace plant, in an ironmaking plant, in a steelmaking plant, in the torpedo car and during ladle transfer.

Preferably, in step B), the pre-treatment of kish-graphite comprises the following successive sub-steps:
  i. A sieving step wherein the kish graphite is classified by size as follows:
     a) Kish graphite having a size below 50 µm,
     b) Kish graphite having a size above or equal to 50 µm, the fraction a) of kish graphite having a size below 50 µm being removed,
  ii. A flotation step with the fraction b) of kish graphite having a size above or equal to 50 µm,
  iii. An acid leaching step wherein an acid is added so that the ratio in weight (acid amount)/(kish graphite amount) is between 0.25 and 1.0,
  iv. Optionally, the kish graphite is washed and dried.

Without willing to be bound by any theory, it seems that when the kish graphite is pre-treated with the method according to the present invention, it allows for the production of reduced graphene oxide having improved quality since the pre-treated Kish graphite has a high purity. Indeed, the Kish graphite obtained after step B) has a purity of at least 90%. Moreover, the pre-treatment step B) is easy to implement at industrial scale and is more environmentally friendly than conventional methods.

In step B.i), the sieving step can be performed with a sieving machine.

After the sieving, the fraction a) of Kish graphite having a size below 50 µm is removed. Indeed, without willing to bound by any theory, it is believed that the kish graphite having a size below 50 µm contains a very small quantity of graphite, for example less than 10%.

Preferably in step B.ii), the flotation step is performed with a flotation reagent in an aqueous solution. For example, the flotation reagent is a frother selected from among: methyl isobutyl carbinol (MIBC), pine oil, polyglycols, xylenol, S-benzyl-S'-n-butyl trithiocarbonate, S,S'-dimethyl trithiocarbonate and S-ethyl-S'-methyl trithiocarbonate. Advantageously, the flotation step is performed using a flotation device.

Preferably, in step B.i), the fraction a) of kish graphite having a size below 55 µm is removed and in step B.ii), the fraction b) of kish graphite has a size above or equal to 55 µm. More preferably, in step B.i), the fraction a) of kish graphite having a size below 60 µm is removed and in step B.ii), the fraction b) of kish graphite has a size above or equal to 60 µm.

Preferably, in steps B.i) and B.ii), the fraction b) of kish graphite has a size below or equal to 300 µm, any fraction of kish graphite having a size above 300 µm being removed before step B.ii).

More preferably in steps B.i) and B.ii), the fraction b) of kish graphite has a size below or equal to 275 µm, any fraction of kish graphite having a size above 275 µm being removed before step B.ii).

Advantageously, in steps B.i) and B.ii), the fraction b) of kish graphite has a size below or equal to 250 µm, any fraction of kish graphite having a size above 250 µm being removed before step B.ii).

In step B.iii), the (acid amount)/(kish graphite amount) ratio in weight is between 0.25 and 1.0, advantageously between 0.25 and 0.9, more preferably between 0.25 and 0.8. For example, the (acid amount)/(kish graphite amount) ratio in weight is between 0.4 and 1.0, between 0.4 and 0.9 or between 0.4 and 1. Indeed, without willing to be bound by any theory, it seems that if the (acid amount)/(kish graphite amount) ratio is below the range of the present invention, there is a risk that the kish graphite comprises a lot of impurities. Moreover, it is believed that if the (acid amount)/(kish graphite amount) ratio is above the range of the present invention, there is a risk that a huge amount of chemical waste is generated.

Preferably, in step B.iii), the acid is selected among the following elements: hydrochloric acid, phosphoric acid, sulfuric acid, nitric acid or a mixture thereof.

The pre-treated Kish graphite obtained after step B) of the method according to the present invention has a size above or equal to 50 µm. The pre-treated Kish graphite has a high purity, i.e. at least of 90%. Moreover, the degree of crystallinity is improved compared to conventional methods allowing higher thermal and electrical conductivities and therefore higher quality.

Once kish graphite has been provided and optionally pre-treated, it is intercalated with a persulfate salt and an acid at room temperature to obtain intercalated kish graphite (step C).

Preferably, in step C), the ratio in weight of persulfate salt with respect to kish graphite is between 1 and 8, more preferably between 1 and 6 and advantageously between 1 and 5. Indeed, without willing to be bound by any theory, it seems that the intercalation is further improved.

Preferably, in step C), the ratio in weight of the acid with respect to kish graphite is between 2 and 8, more preferably between 4 and 8. Indeed, if the ratio of the acid with respect to kish graphite is below 2, there is a risk that only a part of kish graphite is expanded. If the ratio of the acid with respect to kish graphite is above 8, there is a risk that the expansion occurs very slowly and that the volume expansion decreases. It is believed that the acid in excess prevent the persulfate salt from being dragged in the kish graphite interlayer. Therefore, it prevents the release of oxygen from the decomposition of the persulfate salt and thus the exponential expansion of kish graphite.

Preferably, in step C), the persulfate salt is chosen from the ones containing the peroxydisulfate anion $S_2O_8^{2-}$ More preferably, the persulfate salt is chosen from: Sodium persulfate ($Na_2S_2O_8$), Ammonium persulfate (($NH_4)_2S_2O_8$) and Potassium persulfate ($K_2S_2O_8$) or a mixture thereof.

Preferably, in step C), the acid is a strong acid. More preferably, the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof.

Preferably, in step C), kish graphite is first mixed with the acid and then the persulfate salt is added.

Preferably step C) lasts from 2 to 30 minutes.

Once kish graphite has been intercalated, it is expanded (step D).

Preferably, in step D), the expansion is naturally performed by leaving the kish graphite, the persulfate salt and the acid at room temperature in an open vessel. For example, the components are in an opened bowl, opened glassware, opened lab reactor or opened pilot reactor.

Preferably, step D) lasts from 2 to 60 minutes.

Once kish graphite has been expanded, it is oxidized to obtain graphene oxide (step E).

Preferably, step E) comprises the following successive sub-steps:
i. The mixture of the expanded kish graphite, an acid, an oxidizing agent and optionally a salt,
ii. The addition of a chemical element to stop the oxidation reaction,
iii. the separation of graphite oxide from the mixture obtained in step E.ii),
iv. The exfoliation of graphite oxide into graphene oxide.

Thanks to the expanded kish graphite, the oxidation time is significantly reduced compared to the oxidation steps of the prior art. Indeed, the oxidation time can be as short as 10 minutes compared to oxidation times of several hours for the oxidation steps of the prior art. Preferably the oxidation of the expanded kish graphite with an acid, an oxidizing agent and optionally a salt lasts from 5 to 15 minutes. Moreover, it seems that the oxidation of the expanded kish graphite without any salt, allows for an even shorter oxidation time. The ability to remove the salt from the oxidation step significantly limits pollution. Thus, preferably, the expanded kish graphite is mixed with an acid and an oxidizing agent, without any salt. In other words, the mixture of step E.i) preferably consists of kish graphite, acid and oxidizing agent.

Optionally, in step E.i), the salt is chosen from: $NaNO_3$, $NH_4NO_3$, $KNO_3$, $Ni(NO_3)_2$, $Cu(NO_3)_2$, $Zn(NO_3)_2$, $Al(NO_3)_3$ or a mixture thereof. Preferably the ratio in weight of salt with respect to the kish graphite is between 0.2 and 2.

Preferably, in step E.i), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof.

Preferably, in step E.i), the oxidizing agent is chosen from: potassium permanganate ($KMnO_4$), $H_2O_2$, $O_3$, $H_2S_2O_8$, $H_2SO_5$, $KNO_3$, NaClO or a mixture thereof. Preferably the ratio in weight of oxidizing agent with respect to kish graphite is between 2 and 10.

Then, advantageously in step E.ii), the chemical element used to stop the oxidation reaction is chosen from: an acid, non-deionized water, deionized water, $H_2O_2$ or a mixture thereof.

In a preferred embodiment, when at least two chemical elements are used to stop the reaction, they are used successively or simultaneously. Preferably, deionized water is used to stop the reaction and then $H_2O_2$ is used to eliminate the rest of the oxidizing agent. In another preferred embodiment, hydrochloric acid is used to stop the reaction and then $H_2O_2$ is used to eliminate the rest of the oxidizing agent. In another preferred embodiment, $H_2O_2$ is used to stop the reaction and eliminate the rest of the oxidizing agent by this following reaction:

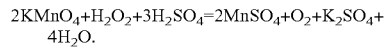

$$2KMnO_4+H_2O_2+3H_2SO_4=2MnSO_4+O_2+K_2SO_4+4H_2O.$$

Without willing to be bound by any theory, it seems that when the chemical element to stop the reaction is added into the mixture, there is a risk that this addition is too exothermic resulting in explosion or splashing. Thus, preferably, the element used to stop the reaction is slowly added into the mixture obtained in step E.i). More preferably, the mixture obtained in step E.i) is gradually pumped into the element used to stop the oxidation reaction. For example, the mixture obtained in step E.i) is gradually pumped into deionized water to stop the reaction.

In step E.iii), the graphite oxide is separated from the mixture obtained in step E.ii). Preferably, the graphene oxide is separated by centrifugation, by decantation or filtration.

Optionally, the graphite oxide is washed. For example, the graphene oxide is washed with an element chosen from among: deionized water, non-deionized water, an acid or a mixture thereof. For example, the acid is selected among the following elements: hydrochloric acid, phosphoric acid, sulfuric acid, nitride acid or a mixture thereof.

Optionally, the graphite oxide is dried, for example with air or at high temperature in the vacuum condition.

Preferably in step E.iv), the exfoliation is performed by using ultrasound, mechanical agitator, sieve shaker or thermal exfoliation. Preferably, the mixture obtained in step E.iii) is exfoliated into one or a few layers of graphene oxide.

By applying the method according to the present invention, graphene oxide comprising at least 25% by weight of oxygen functional groups.

Then, in step F), graphene oxide is reduced into reduced graphene oxide.

Preferably, in step F.i), the reducing agent is chosen from: acid ascorbic; urea; hydrazine hydrate; alkaline solution such as NaOH or KOH; phenols such as gallic acid, tannin acid, dopamine or tea polyphenol; alcohols such as methyl alcohol, ethyl alcohol or isopropyl alcohol; glycine; sodium citrate or sodium borohydride. More preferably, the reducing agent is acid ascorbic since the ascorbic acid is more environmentally friendly.

After the reduction of GO into rGO, optionally rGO is washed. For example, rGO is washed with water. rGO can be dried, for example with air or by lyophilization.

Advantageously, in step F.i), the reduction is performed at a temperature between 50 and 120° C., more preferably between 90 and 100° C.

Preferably, in step F.i), the reduction is performed during less than 24 hours, more preferably during less than 15 hours and advantageously during 1 to 10 hours.

By applying the method according to the present invention, reduced graphene oxide (rGO), comprising one or a few layer(s) of graphene having between 10 and 25% by weight of oxygen functional groups is obtained.

Optionally, in step F.ii), rGO is further reduced into microwave-reduced graphene oxide (MW-rGO).

Preferably, in step F.ii), the catalyst is chosen from: pristine graphene, graphene nanoplatelet(s), graphite or graphite nanoplatelets. More preferably, the catalyst is pristine graphene. Without willing to be bound by any theory, it is believed that pristine graphene can better absorb the electromagnetic field in the form of microwaves due to the nature, the form and the properties of pristine graphene.

Indeed, pristine graphene, being conductive, is a single layer of Graphite consisting of carbons bonded together in a hexagonal honeycomb lattice. It is an allotrope of carbon in the structure of a plane of $sp^2$ bonded atoms with which microwaves are attracted and can easily be absorbed.

Preferably, in step F.ii), the ratio in weight of rGO with respect to the catalyst is as follows:

$$50 \leq \frac{\text{amount of rGO}}{\text{amount of catalyst}} \leq 150.$$

Advantageously, the ratio in weight of rGO with respect to the catalyst is as follows:

$$75 \leq \frac{\text{amount of rGO}}{\text{amount of catalyst}} \leq 125.$$

Without willing to be bound by any theory, it is believed that when the ratio in weight of rGO with respect to the catalyst is as above, the reduction of rGO into MW-rGO is further improved. Indeed, this above ratio leads to MW-rGO having even less oxygen groups.

Preferably, in step F.ii), the microwave frequency is between 300 MHz and 100 GHz, preferably between 1 and 5 GHz and for example, of 2.45 GHz.

Preferably, step F.ii) is performed with a microwave frequency heating device. Preferably, it is a microwave oven.

Advantageously, the microwave has a power between 100 W and 100 KW, more preferably between 100 and 2000 KW.

Preferably, in step F.ii), the microwaving is performed during at least 2 seconds. Indeed, without willing to be bound by any theory, it is believed that when the microwaving is performed during at least 2 seconds, the reduction into MW-rGO is further improved.

Optionally, Microwave-reduced graphene oxide (MW-rGO) comprising one or a few layer(s) of graphene having less than 10% by weight, more preferably less than 7%, by weight of oxygen functional groups is obtained.

FIG. 1 illustrates an example of one layer of reduced graphene oxide according to the present invention. The lateral size means the highest length of the layer through the X axis, the thickness means the height of the layer through the Z axis and the width of the nanoplatelet is illustrated through the Y axis.

Figure 2:
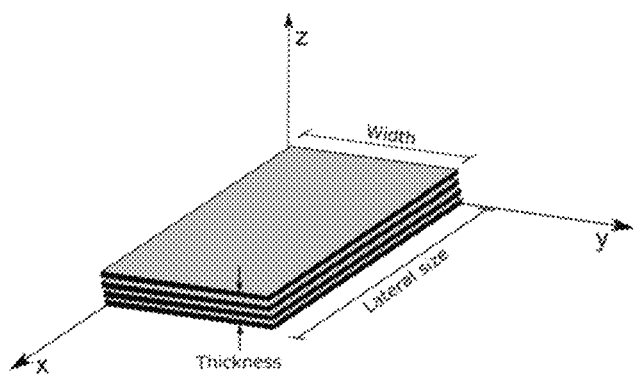
FIG. 2 illustrates an example of a few layers of reduced graphene oxide according to the present invention.

FIG. 2 illustrates an example of a few layers of reduced graphene oxide according to the present invention. The lateral size means the highest length of the layer through the X axis, the thickness means the height of the layer through the Z axis and the width of the nanoplatelet is illustrated through the Y axis.

Preferably, reduced graphene oxide is deposited on metallic substrates to improve some properties such as corrosion resistance of metallic substrates.

In another preferred embodiment, reduced graphene oxide is used as cooling reagent. Indeed, reduced graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid can be used to cool down a metallic substrate.

For example, the metallic substrate is selected from among: aluminum, steel, stainless steel, copper, iron, copper alloys, titanium, cobalt, metal composite, nickel.

The invention will now be further explained based on trials carried out for information only. They are not limiting.

EXAMPLES

Trials 1 to 4 were prepared by providing Kish graphite from steelmaking plant. Then, Kish graphite was sieved to be classified by size as follows:
a) Kish graphite having a size below <63 μm and
b) Kish graphite having a size above or equal to 63 μm.

The fraction a) of Kish graphite having a size below 63 μm was removed.

A flotation step with the fraction b) of Kish graphite having a size above or equal to 63 μm was performed. The flotation step was performed with a Humboldt Wedag flotation machine with MIBC as frother. The following conditions were applied: Cell volume (I): 2, Rotor speed (rpm): 2000, Solid concentration (%): 5-10, Frother, type: MIBC, Frother, addition (g/T): 40, Conditioning time (s): 10 and Water conditions: natural pH, room-temperature.

All Trials were then leached with the hydrochloric acid in aqueous solution with a ratio in weight acid/kish graphite of 0.5. Trials were then washed with deionized water and dried in air at 90° C. The purity of the kish graphite was of 95%.

After, the kish graphite was intercalated at 25 or 35° C. for 5 minutes with ammonium persulfate and sulfuric acid with different ratios. The mixture was then left in an open vessel for 5 minutes to let the kish graphite expand. The obtained material is called expanded Kish Graphite.

Trials 1 to 4 were mixed at room temperature with sulfuric acid and $KMnO_4$ and optionally ammonium nitrate. The mixture contained 1 part by weight of expanded kish Graphite, 3.5 parts by weight of $KMnO_4$, 100 parts by weight of sulfuric acid and optionally 0.5 part by weight of ammonium nitrate. After the oxidation, the mixtures were gradually pumped into deionized water. $H_2O_2$ in aqueous solution was added until there was no more gas production and mixtures were stirred to eliminate the rest of $H_2O_2$.

Then, for all Trials, graphite oxide was separated from the mixture by decantation. It was then exfoliated using ultrasound in order to obtain one or two layer(s) of graphene oxide. Finally, graphene oxide was separated from the mixture by centrifugation, washed with water and dried with air to obtain graphene oxide powder.

L-ascorbic acid were mixed in water with graphene oxide of Trials 1 to 4. The reaction mixtures were agitated at 90° C. to reduce the graphene oxide sheets. Trials were then washed and dried to obtain reduced graphene oxide powder.

Then, for Trials 2 and 3, rGO was disposed in a microwave oven (800 W) under air atmosphere during 2 seconds. A catalyst being Pristine Graphene was added. rGO was reduced into MW-rGO by microwaving.

Graphene oxide and reduced graphene oxide were analyzed by scanning electron microscopy (SEM), X ray diffraction spectroscopy (XRD), Transmission electron microscopy (TEM), LECO analysis and Raman spectroscopy.

Trials 5 and 6 correspond respectively to Trial 1 of WO2018178845 and Trial 1 of PCT/IB2019/052805 now published as WO 2019220228 A1 on Nov. 21, 2019. Table 1 shows the results obtained.

The method of Trials 1 to 4 is more environmental-friendly than comparative Trials. Moreover, the oxidation time with the method of Trials 1 to 4 is significantly lowered compared to the methods of the prior art illustrated with Trials 5 and 6.

Trials 3 and 4 with the intercalation and expansion steps performed at 35° C. confirmed that ambient temperature or 25° C. (Trials 1 and 2) is enough to obtain graphene oxide comprising a high percentage of oxygen groups and correspondingly a reduced graphene oxide of high quality.

Trials 2 and 4 with oxidation times of 1 hour confirmed that oxidation times longer than respectively 10 minutes (Trial 1) and 30 minutes (Trial 3) do not improve any further the quality of the graphene oxide. In other words, extremely short oxidation times are enough to sufficiently oxidize the expanded kish graphite. This significantly reduces the energy consumption.

Trials 1 also confirmed that expanded kish graphite can be oxidized without salt even faster than with salt (Trial 3)). The ability to remove the salt from the oxidation step significantly limits pollution.

Trials 2 and 3 also confirmed that microwaving successfully reduces further the reduced graphene oxide, allowing to reach percentages of oxygen groups below 10%.

| Method | | Trial 1 * | Trial 2 * | Trial 3 * | Trial 4 * | Trial 5 (Trial 1 of WO2018178845) | Trial 6 (Trial 1 of PCT/IB2019/052804) |
|---|---|---|---|---|---|---|---|
| Origin of Kish graphite | | Steelmaking plant | Steelmaking plant | Steelmaking plant | Steelmaking plant | Steelmaking plant | Steelmaking plant |
| Pre-treatment of Kish graphite Sieving step | | Done | Done | Done | Done | Done | Done |
| Intercalation | Compounds | $(NH_4)_2S_2O_8$ and $H_2SO_4$, 25° C. | $(NH_4)_2S_2O_8$ and $H_2SO_4$, 25° C. | $(NH_4)_2S_2O_8$ and $H_2SO_4$, 35° C. | $(NH_4)_2S_2O_8$ and $H_2SO_4$, 35° C. | — | — |
| | Ratio in weight of persulfate salt/kish graphite | 3 | 3 | 3 | 3 | — | — |
| | Ratio in weight of acid/kish graphite | 6 | 6 | 6 | 6 | — | — |
| Expansion | | Static, 25° C. | Static, 25° C. | Static, 35° C. | Static, 35° C. | — | — |
| Oxidation step | Mixture | Done with $H_2SO_4$, $KMnO_4$ | Done with $H_2SO_4$, $KMnO_4$ | Done with $H_2SO_4$, $KMnO_4$ and $NH_4NO_3$ | Done with $H_2SO_4$, $KMnO_4$ and $NH_4NO_3$ | Done with $H_2SO_4$ and $NaNO_3$ | Done with $H_2SO_4$ and $NH_4NO_3$ |
| | Oxidation time | 10 minutes | 1 h | 30 minutes | 1 h | 3 h | 1 h 30 min |
| | Element to stop the reaction | Water followed by $H_2O_2$ | Water followed by $H_2O_2$ | Water followed by $H_2O_2$ | Water followed by $H_2O_2$ | Water followed by $H_2O_2$ | Water followed by $H_2O_2$ |
| | Exfoliation | Ultrasound | Ultrasound | Ultrasound | Ultrasound | Ultrasound | Ultrasound |
| Graphene oxide | | GO comprising 43% of oxygen groups, average Lateral size up to 100 μm, purity of 99.8% | GO comprising 46% of oxygen groups, average Lateral size up to 100 μm, purity of 99.9% | GO comprising 47% of oxygen groups, average Lateral size up to 100 μm, purity of 99.7% | GO comprising 45% of oxygen groups, average Lateral size up to 70 μm, purity of 99.8% | GO comprising 40% of oxygen groups, Lateral size from 20 to 35 μm, purity of 99.5% | GO comprising 49% of oxygen groups, average Lateral size from 10 to 20 μm, purity of 99.5% |
| Reduction step | | Done with acid ascorbic during 3 hours | Done with acid ascorbic during 3 hours | Done with acid ascorbic during 3 hours | Done with acid ascorbic during 3 hours | Done with acid ascorbic during 3 hours | Done with acid ascorbic during 3 hours |
| | | — | microwaved, catalyst pristine graphene, Ratio amount of $\dfrac{rGO}{\text{amount of catalyst}} = 100$ | microwaved, catalyst pristine graphene, Ratio amount of $\dfrac{rGO}{\text{amount of catalyst}} = 100$ | — | — | — |
| Reduced graphene oxide | | Reduced Graphene oxide having an average Lateral size about 40 μm, 21% of oxygen groups, purity of 99.5% | Reduced Graphene oxide having an average Lateral size about 40 μm, 4% of oxygen groups, purity of 99.5% | Reduced Graphene oxide having an average Lateral size about 40 μm, 4% of oxygen groups, purity of 99.5% | Reduced Graphene oxide having an average Lateral size about 40 μm, 21% of oxygen groups, purity of 99.5% | Reduced Graphene oxide having an average Lateral size from 20 to 30 μm with purity of 99.5% and an average thickness of 1-6 nm | Reduced Graphene oxide comprising 17% of oxygen groups and having an average Lateral size from 15 to 30 μm 99.5% and |

| | an average thickness of 1-6 nm |
|---|---|

* according to the present invention

What is claimed is:

1. A method for manufacture of reduced graphene oxide from kish graphite comprising:
    A. providing kish graphite,
    B. optionally, pre-treating the kish graphite,
    C. intercalation of the kish graphite with a persulfate salt and an acid at room temperature to obtain intercalated kish graphite,
    D. expansion of the intercalated kish graphite at room temperature to obtain expanded kish graphite,
    E. oxidation of the expanded kish graphite to obtain graphene oxide, and
    F. reduction of the graphene oxide into reduced graphene oxide having oxygen functional groups including ketone groups, carboxyl groups, epoxy groups and hydroxyl groups,
    wherein the reduced graphene oxide has 25%, or less, of the oxygen functional groups by weight, wherein the expansion of the intercalated kish graphite at room temperature lasts from 2 to 5 minutes.

2. The method as recited in claim 1 wherein step B) is performed and includes the following successive sub-steps:
    i. a sieving step wherein the kish graphite is classified by size as follows:
        a) Kish graphite having a size below 50 μm,
        b) Kish graphite having a size above or equal to 50 μm,
        the fraction a) of kish graphite having a size below 50 μm being removed,
    ii. a flotation step with the fraction b) of kish graphite having a size above or equal to 50 μm,
    iii. an acid leaching step wherein an acid is added so that the ratio in weight (acid amount)/(kish graphite amount) is between 0.25 and 1.0, and
    iv. optionally, the kish graphite is washed and dried.

3. The method as recited in claim 1, wherein in step C), the ratio in weight of the acid with respect to kish graphite is between 2 and 8.

4. The method as recited in claim 1 wherein in step C), the persulfate salt is chosen from the group consisting of: sodium persulfate ($Na_2S_2O_8$), ammonium persulfate (($NH_4)_2S_2O_8$) and potassium persulfate ($K_2S_2O_8$) and mixtures thereof.

5. The method as recited in claim 1 wherein in step C), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) and mixtures thereof.

6. The method as recited in claim 1 wherein in step D), the expansion is naturally performed by leaving the kish graphite, the persulfate salt and the acid at room temperature in an open vessel.

7. The method as recited in claim 1 wherein step E) comprises the following successive sub-steps:
    i. mixture of the expanded kish graphite with the or another acid, an oxidizing agent and optionally a salt,
    ii. addition of at least one chemical element to stop the oxidation reaction,
    iii. separation of graphite oxide from the mixture obtained in step E.ii), and
    iv. exfoliation of graphite oxide into graphene oxide.

8. The method as recited in claim 7 wherein in step E.i), the or another acid is chosen from the group consisting of: $H_2SO_4$, HCl, $HNO_3$, $H_3PO_4$, $C_2H_2Cl_2O_2$ (dichloroacetic acid), $HSO_2OH$ (alkylsulfonic acid) and mixtures thereof.

9. The method as recited in claim 7 wherein in step E.i), the oxidizing agent is chosen from the group consisting of: potassium permanganate, $H_2O_2$, $O_3$, $H_2S_2O_8$, $H_2SO_5$, $KNO_3$, NaClO and mixtures thereof.

10. The method as recited in claim 7 wherein in step E.ii), the chemical element used to stop the oxidation reaction is chosen from the group consisting of: an acid, non-deionized water, deionized water, $H_2O_2$ and mixtures thereof.

11. The method as recited in claim 10 wherein at least two chemical elements are chosen to stop the reaction, the at least two chemical elements being used successively or simultaneously.

12. The method as recited in claim 7 wherein in step E.ii), the mixture obtained in step E.i) is gradually pumped into the chemical element used to stop the oxidation reaction.

13. The method as recited in claim 7 wherein in step E.iii), the graphite oxide is separated by centrifugation, decantation, distillation or filtration.

14. The method as recited in claim 7 wherein in step E.iv), the exfoliation is performed by using ultrasound, mechanical agitator, sieve shaker or thermal exfoliation.

15. The method as recited in claim 7 wherein step F) includes the following sub-steps:
    i. reduction of GO into reduced graphene oxide (rGO), including one layer or a few layers of graphene having between 10 and 25% by weight of oxygen functional groups, using a reducing agent; and
    ii. Optionally, the reduction of rGO into microwave-reduced graphene oxide (M W-rGO), comprising one layer or a few layers of graphene having less than 10% by weight of oxygen functional groups, by microwaving rGO under air atmosphere in presence of a catalyst.

16. The method as recited in claim 15 wherein in step F.i), the reducing agent is chosen from the group consisting of: ascorbic acid; urea; hydrazine hydrate; an alkaline solution; phenols; alcohol; glycine; sodium citrate and sodium borohydride.

17. The method as recited in claim 15 wherein in step F.ii), the catalyst is chosen from the group consisting of: pristine graphene, graphene nanoplatelets, graphite and graphite nanoplatelets.

18. The method as recited in claim 1 wherein in step C), the acid is chosen from: $H_2SO_4$, HCl, $HNO_3$, $H_3PO_4$, $C_2H_2Cl_2O_2$ (dichloroacetic acid), and mixtures thereof.

19. The method as recited in claim 7 wherein in step E.i), the or another acid is chosen from the group consisting of: $H_2SO_4$, HCl, $HNO_3$, $H_3PO_4$, $C_2H_2Cl_2O_2$ (dichloroacetic acid), and mixtures thereof.

20. The method of claim 1, wherein the kish graphite is a residue of the steelmaking process.

21. The method of claim 1, wherein the intercalation of the kish graphite with a persulfate salt and an acid at room temperature lasts from 2 to 30 minutes.

22. The method of claim 1, wherein the oxidation of the expanded kish graphite to obtain graphene oxide lasts from 10 to 30 minutes.

23. The method of claim 1, wherein the expanded graphite is oxidized without salt.

24. The method of claim 1, wherein the intercalation of the kish graphite with a persulfate salt and an acid at room temperature lasts from 2 to 5 minutes.

25. The method of claim 1, wherein the reduced graphene oxide has 4 to 25% of the oxygen functional groups by weight.

26. A method for manufacture of reduced graphene oxide from kish graphite comprising:
   A. providing kish graphite,
   B. optionally, pre-treating the kish graphite,
   C. intercalation of the kish graphite with a persulfate salt and an acid at room temperature to obtain intercalated kish graphite,
   D. expansion of the intercalated kish graphite at room temperature to obtain expanded kish graphite,
   E. oxidation of the expanded kish graphite to obtain graphene oxide and
   F. reduction of the graphene oxide into reduced graphene oxide having oxygen functional groups including ketone groups, carboxyl groups, epoxy groups and hydroxyl groups,
   wherein the oxidation of the expanded kish graphite to obtain graphene oxide lasts from 10 minutes to 1 hour, and
   wherein the expansion of the intercalated kish graphite at room temperature lasts from 2 to 5 minutes.

27. The method of claim 26, wherein the expanded graphite is oxidized without salt.

28. The method of claim 26, wherein the reduced graphene oxide has between 4 and 25% of the oxygen functional groups by weight.

29. The method of claim 26, wherein the oxidation of the expanded kish graphite to obtain graphene oxide lasts from 10 to 30 minutes.

30. The method of claim 26, wherein the kish graphite is a residue of the steelmaking process.

* * * * *